2,954,354
Patented Sept. 27, 1960

2,954,354

METHOD OF PREPARING ALKYD RESIN FROM ISOPHTHALIC ACID

Samuel Young, Jr., Park Forest, Ill., assignor to Standard Oil Company, Chicago, Ill., a corporation of Indiana No Drawing. Filed May 24, 1957, Ser. No. 661,293

3 Claims. (Cl. 260—22)

This invention relates to the preparation of alkyd resins. More particularly, the invention relates to the elimination of operating difficulties caused by the use of isophthalic acid in the preparation of an alkyd resin.

The alkyd resins of commerce have been made almost exclusively with phthalic anhydride as the benzenecarboxylic acid component since this material has been readily available. Despite the fact that phthalic anhydride sublimes in appreciable quantity at alkyd resin reaction temperatures and condenses in the reflux condenser means attached to the reaction vessel no serious problem has arisen with equipment clogging due to said sublimation, when the cooking is carried out with a xylene solvent present. Very recently isophthalic acid has become available in commercial quantites and is being used as the sole benzenecarboxylic acid component or in admixture with other benzenecarboxylic acids in alkyd resins preparation. The vapor pressure of isophthalic acid is very much less than that of phthalic anhydride and theoretically much less isophthalic acid should sublime into the reflux condenser means; theoretically heat transfer and other problems would be less with the isophthalic acid than with phthalic anhydride. This is not true. It has been found that the presence of isophthalic acid in the alkyd resin reaction vessel introduces a very serious problem of reflux condenser means clogging. Even in the presence of a xylene solvent during the cook isophthalic acid forms in the reflux condenser means, a fluffy or puffy solid phase which bridges across the openings in the condenser means and effectively closes the reflux condenser means to entry of vapors from the reaction vessel. A very small amount of isophthalic acid is sufficient to cause this blockage and the problem is serious even though a mixture of acids is being used of which isophthalic is only a minor component. As isophthalic acid does impart desirable characters to alkyd resins used for protective surface coating, manufacturers wish to use this material but the operational difficulties do present such a problem that economic considerations have reduced the amount of isophthalic acid going into commercial alkyd resins. One of the attempted solutions to this problem has been the use of xylene as a solvent in the alkyd reaction zone. This material alone has not been more than palliative.

An object of the invention is a process for preparing alkyd resins wherein isophathalic acid is one of the reactants which process is not troubled with clogged reflux condenser means. A particular object is a process for preparing alkyd resins using isophthalic acid as one of the reactants which process is free from reflux condenser clogging through isophthalic acid sublimation. Other objects will become apparent in the course of the detailed description.

It has been found that only tiny amounts of isophthalic acid need be introduced in the vapor form into a condenser in order to clog the condenser by the formation of a light fluffy or puffy solid phase, if water vapors are simultaneously present with the isophthalic acid vapors in the condensing zone. It appears that some sort of reaction takes place between th isophthalic acid and the water so that the solid phase condensing from the mixture of isophthalic vapors and water vapor is very fluffy forming an expanded structure which occupies a great deal of space for its weight. In the absence of water vapor isophthalic acid vapors condense to form a thin dense film on the surface of the condenser. By coincidence the deposition of the puffy isophthalic acid solid phase in the reflux condenser system connected to an alkyd resin reaction vessel reaches maximum at about the time that the production of the water of reaction from the alkyd resin reaction has ended. Under normal conditions of reaction time this may represent a period of 1 to 24 hours after the initial reaction has started.

It has been discovered that liquid methanol is an excellent solvent for the puffy isophthalic acid solid phase and sweeps this solid phase easily from the reflux condenser means. As it is necessary to remove the water of reaction continuously from the system, methanol should not be introduced into the reaction system during the time that water is being produced in substantial amounts, in order to reduce the loss of methanol from the system along with the water discard. It is preferred to introduce liquid methanol into the system just about the time that clogging of the reflux condenser means becomes a real obstacle to further reaction; the liquid methanol is preferably introduced into the system through the reflux condenser means thereby quickly dissolving away the isophthalic acid solid phase and bringing back the reflux condenser means to full efficiency. The methanol may be introduced into the reaction vessel where it flashes into vapors and passes up to the reflux condenser means. It is self evident that this procedure will be slower than by the introduction of liquid methanol through the reflux condenser means because the methanol will have to progressively dissolve away the isophthalic solid phase going up the reflux condenser rather than washing it away in the course of downward flow toward the reaction vessel. It is to be understood that enough liquid methanol must be used to sweep away the solid phase already formed and also to keep the condenser surfaces substantially free of additional isophthalic acid material during the remainder, at least of the period during which sufficient water is being formed to permit the build-up of the puffy solvent phase. In general it has been found that the use of between about 2 and 5 weight percent of methanol, based on reactants charged to the alkyd resin reaction vessel, is sufficient to give complete satisfactory operation of the reflux condenser system. The use of the methanol addition of the invention does not in any way harm the properties of the alkyd resin reaction product. Within the accuracy of the various characterization procedures there is no difference between alkyd resin prepared without methanol usage and alkyd resin prepared with methanol usage.

It is to be understood that the invention may be utilized with any alkyd resin reaction wherein isophthalic acid is present in a substantial amount, i.e., enough to cause condenser difficulty. The invention is particularly useful when isophthalic acid is the major acid or the sole benzenecarboxylic acid present.

It is to be understood that the alkyd resin preparation in which the methanol addition is useful may involve any one of the well known components of alkyd resin reactions, particularly those reactions which produce an oil modified alkyd resin.

The polyhydric alcohol component may be any one of the alcohols containing 2 or more hydroxyl groups, examples of suitable alcohols are: ethyleneglycol, diethyleneglycol, propyleneglycol, dipropyleneglycol, glycerol, trimethylol ethane, pentaerythritol, dipentaerythritol, sorbitol and mannitol.

The acid used may be any one of the polybasic acids now known. These acids are for example, phthalic acid, phthalic anhydride, trimesic, trimellitic, trimellitic anhydride, hemimellitic, etc. It has been pointed out previously each of these acids will be used in admixture with isophthalic acid.

The oil-modified alkyd resins utilize in the reaction zone one or more of the conventional vegetable oils and marine oils or the fatty acids derived from one of these oils or a single one of the various fatty acids. The vegetable oils which are commonly used for this purpose are: linseed, soybean, tung, castor, dehydrated castor, oiticica, cocoanut, cottonseed, rapeseed, perilla, corn, poppyseed, tall, safflower. The marine oils commonly used are: herring, sardine and menhaden.

These vegetable and marine oils are often classified as drying, semi-drying and non-drying oils. Linseed oil is an example of a commonly used drying oil; soybean oil is a typical semi-drying oil; and cottonseed is an example of a non-drying oil. The oils may be processed to obtain a mixture of fatty acids which are designated by the name of the source oil. For example, soya fatty acids are derived from soybean oil. The more or less pure individual fatty acids may also be utilized in the preparation of the composition. Commonly utilized fatty acids are: capric, lauric, myristic, palmitic, stearic, behenic, oleic, linoleic, linolenic, ricinoleic, erucic.

Any of the numerous conventional procedures for the preparation of oil-modified alkyd resins may be utilized. In general, the desired amount of the particular fatty acid or oil and the alcohol are charged to a reaction vessel and are heated to a temperature on the order of 180° C. to 230° C., the higher temperatures being utilized with the higher boiling point alcohols. A suitable catalyst such as lime or litharge is added and the reaction continued until the alcohol-oil product has a methanol compatibility of about 1:4. At this point, the desired benzene carboxylic acid is added and a reaction carried out at either the same temperature as the alcoholosis reaction or preferably at the somewhat lower temperature of about 200° C. The acid may be charged all at once or gradually over a period of time. The reaction is continued until the desired acid number and viscosity of the reaction product have been obtained.

The results obtainable with the process of the instant invention are compared with results obtained in identical reactions without the addition of methanol. In the illustrative runs set out hereinafter the reactants were charged to a three-necked flask or a small resin kettle as indicated. In the alkyd resins of these examples the oil and the glycerol were charged to a flask equipped with a motor driven stirrer, a thermometer and a reflux condenser.

Provision was made to maintain a nitrogen atmosphere in the flask. Calcium hydroxide was used as the alcoholsis catalyst. The reaction was continued until the oil-glycerol mixture had a methanol compatibility of about 1:5. At this point the acid was added and the reaction continued until the desired viscosity and acid number material was obtained.

In runs 1 and 2 after 4 hours of cooking the flux condenser and the water trap were plugged with the fluffy white solid phase. Inspection of the solid phase showed it to be isophthalic acid. In runs 3 and 4 at the end of 4 hours about 50 ml. of liquid methanol were added to the reflux condenser the liquid methanol dissolved all the solid phase from the reflux condenser and water trap and passed into the reaction vessel. Though cooking was continued for 1 additional hour in run 3 and 2 additional hours in run 4 the reflux condenser and water trap remained completely clean after the methanol had been added. Run No. 5 was carried out in a small resin kettle and produced identical results with respect to clogging and clean up on methanol after methanol addition to the reflux condenser system. The operating conditions, the reactants, and the results of runs 1 through 5 are set out in Table I.

In Table II there is set out characterizations by conventional procedures of the alkyd resins prepared in run No. 4. A sample of material was withdrawn after 4 hours of cooking immediately prior to methanol addition. Samples were withdrawn after 1 hour and 2 hours, respectively subsequent to methanol addition. The inspection shown in Table II shows that the methanol addition had essentially no effect on the characteristics of the alkyd resin product.

TABLE I

*Formation and removal of sublimed IPA during cook*

| Run No. | 1 | 2 | 3 | 4 | 5 |
|---|---|---|---|---|---|
| Feed, Gm. | | | | | |
| Soybean Oil | 650 | 650 | 650 | 650 | 650. |
| Glycerin | 142 | 142 | 142 | 142 | 142. |
| Calcium Hydroxide | 0.25 | 0.25 | 0.25 | 0.25 | 0.25. |
| Isophthalic Acid | 304 | 304 | 304 | 304 | 304. |
| Operating Conditions: | | | | | |
| Temperature, °C. | 232 | 232 | 232 | 232 | 232. |
| Length of Cook, Hours | 5 | 5 | 5 | 6 | 6. |
| Reactor Type | 5 Liter, 3 Neck Flask. | 5 Liter, 3 Neck Flask. | 5 Liter, 3 Neck Flask. | 5 Liter, 3 Neck Flask. | 2 Liter Resin Kettle. |
| Final Products, Properties: | | | | | |
| Acid No. | 9.5 | 9.5 | 11.8 | 14.8 | 8.3. |
| Percent Solids | 60 | 60 | 60 | 60 | 60. |
| Solvent | M.S | M.S | M.S | M.S | M.S. |
| Viscosity (60% N.V.) | G | P | X | N-O | O. |
| Color | 11 | 7 | 7 | 11 | 9. |
| Condenser | Caked | Caked | Caked [1] | Caked [1] | Caked [1]. |
| Water Trap | Caked | Caked | Caked [1] | Caked [1] | Caked [1]. |

[1] Before refluxing with methanol, clean thereafter.

TABLE II

*Effect of methanol reflux on IPA alkyd properties*

| | Run No. 4 | | |
|---|---|---|---|
| | 4 hr. Cook— Before MeOH Addition | 5 hr. Cook— 1 hr. After MeOH Addition | 6 hr. Cook— 2 hr. After MeOH Addition |
| Viscosity, Poises (60% N.V.) | 3.3 | 2.8 | 3.6 |
| Acid Number | 7.5 | 8.6 | 7.1 |
| Drying Time, Hours: | | | |
| Set to Touch | 3 | 2.5 | 2.5 |
| Set to Cotton | 3.5 | 3 | 3 |
| Sward Hardness: | | | |
| 1 Day | 0 | 0 | 0 |
| 1 Week | 2 | 1 | 2 |
| 2 Weeks | 2 | 2 | 3 |
| 3 Weeks | 2 | 2 | 4 |

I claim:

1. In the process of preparing alkyd resins wherein (I) a polyhydric alcohol selected from the class consisting of ethyleneglycol, diethyleneglycol, propyleneglycol, dipropyleneglycol, glycerol, trimethylol ethane, pentaerythritol, dipentaerythritol, sorbitol and mannitol and (II) a member selected from the class consisting of vegetable oil, marine oil and fatty acids derivable from said oils are reacted at a temperature between about 180° C.–230° C. for the time needed to obtain a product having the desired methanol compatability and this alcoholysis reaction product is then further reacted with (III) a benzenecarboxylic acid selected from the class consisting of (1) isophthalic acid and (2) mixtures of isophthalic acid and an acid selected from the group consisting of phthalic acid, phthalic anhydride, trimesic acid, trimellitic acid, trimellitic anhydride and hemimellitic acid, wherein said isophthalic acid is the major component of said mixture, are reacted at a temperature on the order of 180° C. to 230° C., while continuously removing water produced in the reaction and returning condensed reactants to said reaction zone by way of a reflux condenser means, until the acid number and viscosity desired for the alkyd resin product have been obtained and wherein said reflux means would become substantially plugged, over the course of the reaction time, by the formation therein of a fluffy solid phase comprising isophthalic acid, the improvement whereby said plugging is essentially eliminated by carrying out said reaction in the presence of methanol in an amount between about 2 and 5 weight percent based on reactants charged to said reaction zone, said methanol being introduced into said reaction zone at about the time substantially all of the water of alkyd resin reaction has passed overhead and been removed from said reaction zone, whereby said alkyd resin reaction is enabled to be completed with the aforesaid reflux condenser means maintained substantially free of the aforesaid fluffy solid phase after said methanol introduction.

2. The process of claim 1 wherein said benzenecarboxylic acid is isophthalic acid.

3. The improvement of claim 1 wherein said methanol is introduced into said reaction zone by way of said reflux means.

References Cited in the file of this patent

UNITED STATES PATENTS

| | | |
|---|---|---|
| 2,061,635 | Sandig | Nov. 24, 1936 |
| 2,530,144 | Bannon | Nov. 14, 1950 |

FOREIGN PATENTS

| | | |
|---|---|---|
| 414,665 | Great Britain | Aug. 7, 1934 |